United States Patent [19]
Stacey et al.

[11] Patent Number: 5,895,098
[45] Date of Patent: Apr. 20, 1999

[54] REAR MANUAL BRAKE CONTROL FOR AN ELECTRO-HYDRAULIC BRAKING SYSTEM

[75] Inventors: Scott Alan Stacey, Centerville, Ohio; Xavier Marie Groult, Paris; Bernard Claude Veron, Courbevoie, both of France

[73] Assignee: General Motors Corporation, Detroit, Mich.

[21] Appl. No.: 08/944,772

[22] Filed: Oct. 6, 1997

[51] Int. Cl.$^6$ .................................................. B60T 8/48
[52] U.S. Cl. .................. 303/3; 303/15; 303/115.2; 303/189
[58] Field of Search .................. 303/113.5, 115.2, 303/162, 176, 186, 188, 3, 189, 15

[56] References Cited

U.S. PATENT DOCUMENTS

| | | | |
|---|---|---|---|
| 4,934,761 | 6/1990 | Sauvageot et al. | 303/189 |
| 5,246,283 | 9/1993 | Shaw et al. | 303/115.2 |
| 5,362,135 | 11/1994 | Riddiford et al. | 303/3 |
| 5,573,312 | 11/1996 | Muller et al. | 303/189 |

*Primary Examiner*—Matthew C. Graham
*Assistant Examiner*—Robert Siconolfi
*Attorney, Agent, or Firm*—Anthony Luke Simon

[57] ABSTRACT

A control method for a manual back-up electro-hydraulic braking system in which the rear service brakes of the vehicle are intentionally operated in a manual back-up mode under specified non-failure operating conditions to conserve electrical energy. The manual back-up mode for the rear service brakes is initiated if braking is commenced while the vehicle speed is below a near-zero threshold speed. If braking is commenced above the threshold speed, the manual back-up mode for the rear service brakes is initiated when the vehicle speed falls below the threshold and the pressure command for the rear brakes has been substantially constant for at least a predetermined time. In this case, the rear manual back-up mode is initiated by reducing the rear brake pressure command to the rear boost units at a controlled rate until the rear brake pressure reaches the manually developed pressure, and then entering the manual back-up mode. Once the rear manual back-up mode is initiated, it remains in effect until the driver releases the brake pedal.

12 Claims, 2 Drawing Sheets

REAR MANUAL BRAKE CONTROL FOR AN ELECTRO-HYDRAULIC BRAKING SYSTEM

TECHNICAL FIELD

This invention relates to electro-hydraulic (EH) braking systems in which hydraulic brake pressures are developed by multiple electro-hydraulic modules instead of a vacuum booster, and more particularly to a control for allowing the rear brakes of a vehicle to be controlled by a manually developed hydraulic pressure under certain circumstances.

BACKGROUND OF THE INVENTION

In conventional automotive braking systems, a master cylinder converts driver exerted brake pedal force into a corresponding hydraulic pressure, which is proportioned among the front and rear brakes. In power assisted braking systems, a vacuum booster is interposed between the pedal and the master cylinder to amplify the force applied to the master cylinder by using engine vacuum to create a pressure differential across one or more diaphragms coupled to the master cylinder.

As an alternative to the above-described conventional braking system, it has been proposed to use electrically powered boost units to develop the amplified brake pressures. Such systems—referred to herein as electro-hydraulic, or EH, systems—can advantageously be used, for example, in electric vehicles where there is no convenient vacuum source. Even in vehicles powered by an internal combustion engine, EH braking systems can be used to advantage for integrating advanced braking controls such as anti-lock braking, traction control and collision avoidance.

One example of an EH braking system is disclosed in the U.S. Pat. No. 5,246,283 to Shaw et al., issued Sep. 21, 1993, and assigned to the assignee of the present invention. In that system, the master cylinder pressure is coupled through normally open solenoid operated fluid valves and electrically powered boost units to the individual service brakes. In normal braking, the solenoid operated valves are activated to isolate the master cylinder from the service brakes, and the electrically powered boost units are activated to develop brake pressures based on a desired brake effort determined by an electronic controller. In the event of an electrical failure, the solenoid operated valves return to their normally open state, re-coupling the master cylinder to the service brakes, allowing continued braking with the manually developed master cylinder pressure. A system of this type is referred to herein as a manual back-up EH system.

A drawback of EH braking systems in general is that electric power consumption by the boost units can be considerable during extended idling when a high level of braking force is not actually required. This can occur, for example, while waiting for a traffic light, particularly if the driver is exerting significant brake pedal force. In addition to the unnecessary power consumption, this condition causes unnecessary heat generation in the boost units and controller, possibly adversely affect their durability.

SUMMARY OF THE INVENTION

The present invention is directed to an improved control method for a manual back-up EH braking system in which the rear service brakes of the vehicle are intentionally operated in a manual back-up mode under specified non-failure operating conditions. Power consumption is decreased under the specified conditions, and the durability of the controller and the rear brake boost units is improved accordingly. In vehicles powered by an internal combustion engine, the decreased power consumption is ultimately realized in the form of improved fuel economy.

According to a preferred embodiment of this invention, the manual back-up mode for the rear service brakes is initiated if braking is commenced while the vehicle speed is below a near-zero threshold speed. If braking is commenced above the threshold speed, the manual back-up mode for the rear service brakes is initiated when the vehicle speed falls below the threshold and the pressure command for the rear brakes has been substantially constant for at least a predetermined time. In this case, the rear manual back-up mode is initiated by reducing the rear brake pressure command to the rear boost units at a controlled rate until the rear brake pressure reaches the manually developed pressure, and then entering the manual back-up mode. Once the rear manual back-up mode is initiated, it remains in effect until the driver releases the brake pedal.

DETAILED DESCRIPTION OF THE DRAWINGS

Figure 1:
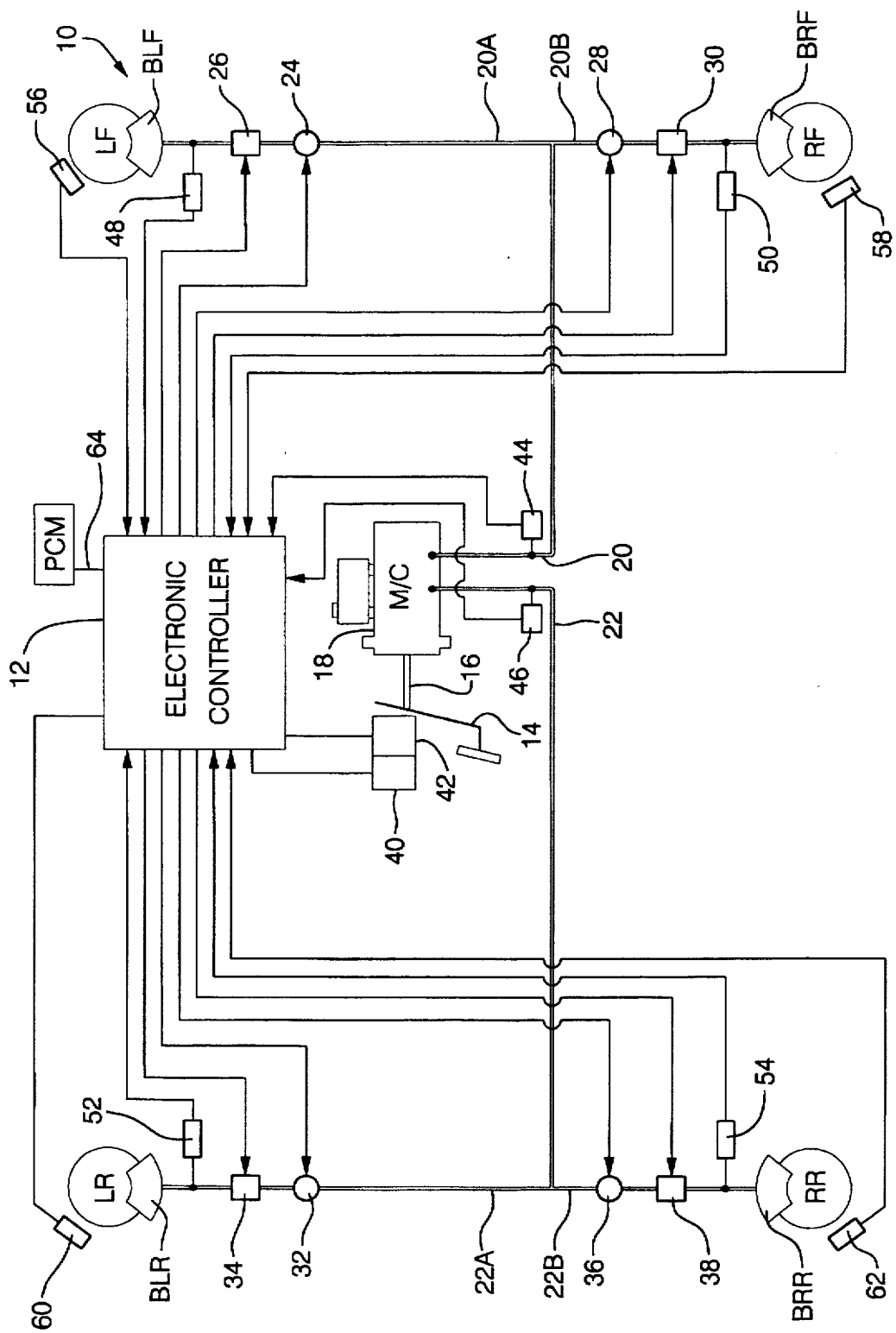
FIG. 1 is a schematic diagram of an EH braking system and electronic controller according to this invention.

Referring to FIG. 1, the reference numeral 10 generally designates a four-channel manual back-up EH braking system for individually developing hydraulic braking pressure for the service brakes $B_{LR}$, $B_{RR}$, $B_{LF}$ and $B_{RF}$ of the left-rear (LR), right-rear (RR), left-front (LF) and right-front (RF) vehicle wheels, respectively, under the control of an electronic controller 12. A driver-manipulated brake pedal 14 is coupled via rod 16 to master cylinder 18, which develops hydraulic pressure in proportion to the driver exerted braking force applied to pedal 14. The master cylinder 18 proportions the developed pressure among front brake supply line 20 and rear brake supply line 22 in a conventional manner. Supply line 20 is coupled to the left-front service brake $B_{LF}$ via line 20a, isolation valve 24 and motor-operated boost unit 26, and to the right-front service brake $B_{RF}$ via line 20b, isolation valve 28 and motor-operated boost unit 30. In a similar manner, supply line 22 is coupled to the left-rear service brake $B_{LR}$ via line 22a, isolation valve 32 and motor-operated boost unit 34, and to the right-rear service brake $B_{RR}$ via line 22b, isolation valve 36 and motor-operated boost unit 38. The isolation valves 24, 28, 32 and 36 are normally-open solenoid fluid valves operated by electronic controller 12, and can be closed in normal braking operation to isolate the master cylinder pressure from the respective brakes $B_{LF}$, $B_{RF}$, $B_{LR}$, $B_{RR}$. The motor-operated boost units 26, 30, 34 and 38 are supplied with hydraulic fluid from master cylinder 18 when braking is not required, and operate under the control of electronic controller 12 to develop and supply a desired brake pressure to the respective brakes $B_{LF}$, $BRF_{LR}$, $B_{RR}$. In the event of an electrical failure, the isolation valves 24, 28, 32 and 36 return to their normally open state, re-coupling the master cylinder supply lines 20 and 22 to the service brakes, allowing continued braking with the manually developed master cylinder pressure. Representative isolation valves and motor-operated boost units are shown and described in detail in the aforementioned U.S. Pat. No. 5,246,283, which is incorporated herein by reference.

In carrying out the control of isolation valves 24, 28, 32 and 36 and boost units 26, 30, 34 and 38, electronic controller 12 receives inputs from a number of braking system sensors, including brake pedal depression switch 40, pedal travel sensor 42, front and rear master cylinder pressure sensors 44 and 46, and individual brake pressure sensors 48, 50, 52 and 54. Vehicle speed information is obtained from the wheel speed sensors 56, 58, 60 and 62, which are customarily provided for anti-lock brake control of the system. Additionally, the controller 12 may receive and/or provide information to a powertrain control module PCM via communication bus 64.

In general, the controller 12 generates a brake pressure command for each of the vehicle wheels based on the sensed movement of brake pedal 14 and the pressure developed in master cylinder 18. Other factors involving anti-lock braking, traction control, and vehicle handling may also influence the brake pressure commands. The controller supplies corresponding levels of motor current to the boost units 26, 30, 34 and 38, and uses the feedback signals from pressure sensors 48, 50, 52 and 54 to ensure that the pressure commands are actually realized. An example of such a control is shown and described in the U.S. Pat. No. 5,362,135 to Riddiford et al., issued on Nov. 8, 1994, and assigned to the assignee of the present invention, such patent being incorporated herein by reference.

According to this invention, the controller 12 controls braking in one of two modes, identified herein as the normal mode and the rear manual mode. In the normal mode, the front and rear isolation valves 24, 28 and 32, 36 are energized to isolate the master cylinder supply lines 20 and 22, and the front and rear boost units 26, 30 and 34, 38 are controlled to develop brake pressure in accordance with the respective brake pressure commands. In the rear manual mode, the front brakes $B_{LF}$, $B_{RF}$ are controlled as in the normal mode, and the rear isolation valves 32 and 36 and the rear boost units 34 and 38 are deactivated so that the rear brakes $B_{LR}$, $B_{RR}$ are controlled by the hydraulic pressure in rear supply line 22. If the vehicle speed is lower than a predetermined threshold speed upon depression of the brake pedal 14, the rear manual mode is initiated immediately. However, if the vehicle speed is higher than the predetermined threshold upon depression of the brake pedal 14, the controller initiates the normal mode, and then transitions to the rear manual mode if entry conditions concerning vehicle speed, rear pressure command and pressure matching are met.

The threshold speed is preferably calibratable to take into account the low speed sensing capability of the wheel speed sensors 56–62. It is known, for example, that certain sensors cannot reliably detect zero speed; in such case, the threshold may be set to 3–4 MPH, for example. If the sensors are capable of reliably detecting zero speed, the threshold may be set lower. The objective, as explained above, is to detect a condition under which the vehicle is stopped, or nearly stopped, prior to initiating the rear manual mode. This ensures that the vehicle will have adequate overall braking effort without rear brake boost pressure.

Figure 2:
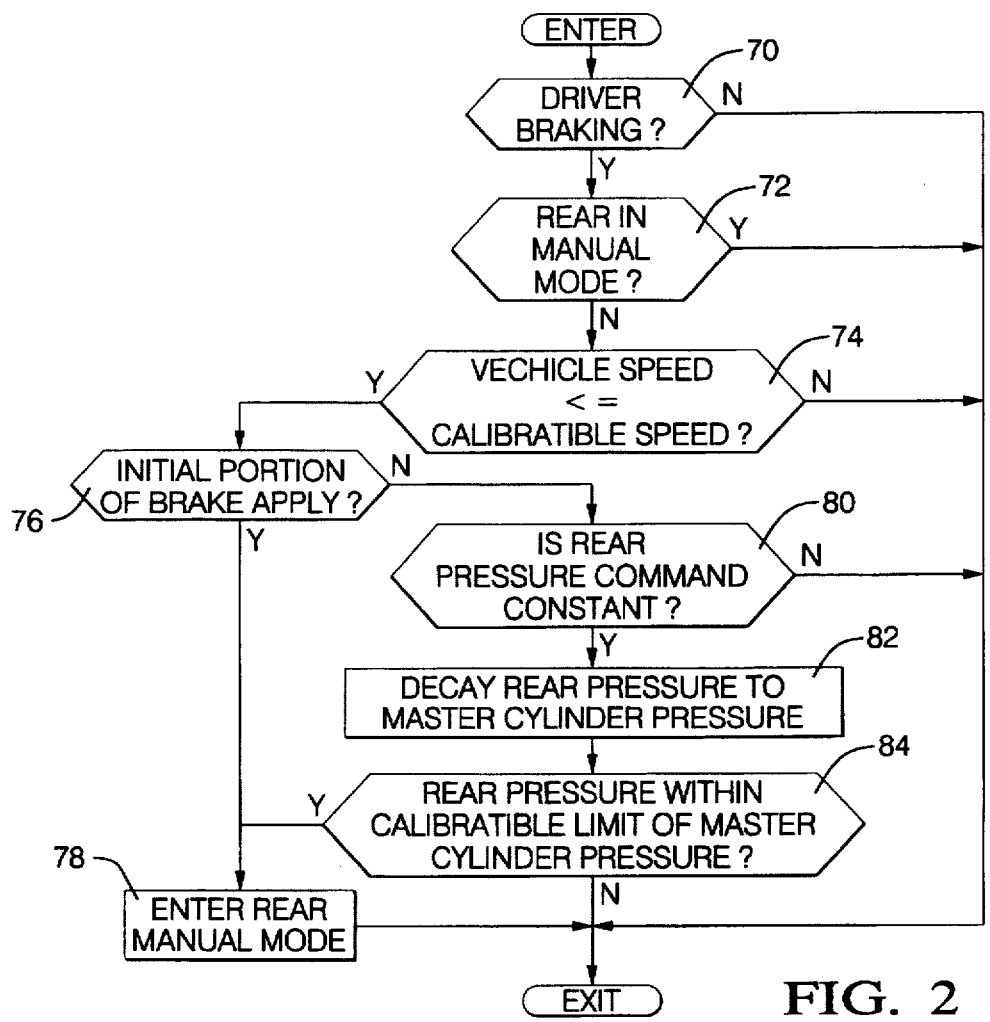
FIG. 2 is a flow diagram representative of computer program instructions executed by the controller of FIG. 1 in carrying out the control method of this invention.

The above-described control is illustrated in the flow diagram of FIG. 2, which is executed by controller 12 as part of the overall control algorithm. If the brake pedal 14 is depressed and the rear manual mode has not already been initiated, as determined at blocks 70 and 72, respectively, the block 74 is executed to compare the vehicle speed to a threshold speed as described above. If the vehicle speed is less than or equal to the threshold, the block 76 is executed to determine if the brakes have just been applied. This may be determined, for example, with a timer that is reset upon depression of the brake pedal 14, as detected by the switch 40. If the timer value is very low, the controller 12 determines that the vehicle speed was below the threshold when the pedal 14 was depressed, and the block 78 is executed to immediately initiate the rear manual mode. In subsequent execution of the routine during the brake apply, block 72 will be answered in the affirmative so that the rear manual mode is maintained until the pedal 14 is released.

Figure 3:
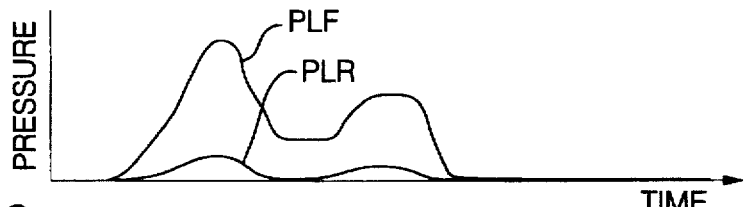
FIG. 3 is a graph illustrating the operation of the control method of this invention when the vehicle speed is below a threshold speed at the commencement of braking.

A graphical illustration of the zero-velocity brake apply is given in FIG. 3, which shows the boosted left-front brake pressure $P_{LF}$ and the manual left-rear brake pressure $P_{LR}$ on a common time base. The left-rear brake pressure $P_{LR}$ and the master cylinder pressure in supply line 22 are identical during the entire apply since the rear manual mode is entered immediately upon depression of the pedal 14.

If the execution of block 76 indicates that the brakes were applied before the vehicle speed reached the speed threshold of block 74, the braking system is already operating in the normal mode, and the block 80 is executed to determine if the rear pressure command has been substantially constant for a predetermined period of time. This may be determined, for example, with a timer that is reset whenever the rear pressure command changes by more than a predetermined amount or percentage. Alternatively, the controller could monitor the brake pedal force, rear brake pressures or master cylinder pressure, for example. If block 80 is answered in the affirmative, block 82 is executed to decay the rear pressure command toward the rear master cylinder pressure, as detected by pressure sensor 46. When the rear brake pressures, as determined by pressure sensors 52 and 54 reach the rear master cylinder pressure, as determined at block 84, the block 78 is executed to enter the rear manual mode. In subsequent execution of the routine during the brake apply, block 72 will be answered in the affirmative so that the rear manual mode is maintained until the pedal 14 is released.

Figure 4:
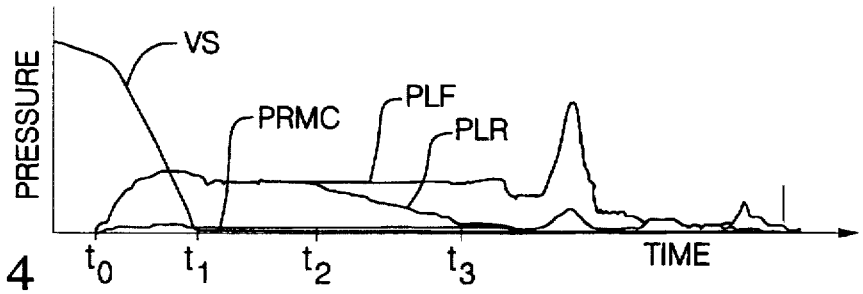
FIG. 4 is a graph illustrating the operation of the control method of this invention when the vehicle speed is above a threshold speed at the commencement of braking.

A graphical illustration of the non-zero velocity brake apply is given in FIG. 4, which shows the vehicle speed VS, the boosted left-front brake pressure $P_{LF}$, the left-rear brake pressure $P_{LR}$ and the rear master cylinder pressure $P_{RMC}$, all on a common time base. Initially, the vehicle speed is well above the near-zero threshold speed, and braking commences in the normal mode at time $t_0$. In this mode, the front and rear brake pressures $P_{LF}$ and $P_{LR}$ are both boosted in relation to the master cylinder pressure $P_{RMC}$, and substantially coincide. At time $t_1$, the braking brings the vehicle speed substantially to zero, and after a predetermined interval of substantially constant rear brake pressure command at time $t_2$, the rear brake pressure $P_{LR}$ is decayed toward the master cylinder pressure $P_{RMC}$. At time $t_3$, the rear brake pressure $P_{LR}$ reaches the master cylinder pressure $P_{RMC}$, and the rear manual mode is engaged. Thereafter, the rear brake pressure $P_{LR}$ and the master cylinder pressure $P_{RMC}$ are identical.

In summary, this invention provides a novel method of operation for manual back-up EH braking system by allowing the controller to control braking in either the normal mode or a rear manual mode in which the rear brakes are operated in a manual back-up mode while the front brakes continue to operate in the normal mode. This allows the controller to conserve the electrical energy that would otherwise be consumed by the rear boost units 34 and 38 under zero velocity conditions where adequate braking is available with the combination of boosted front brake pressure and non-boosted rear brake pressure. If the vehicle is moving when braking is commenced, the above described pressure monitoring, decay and matching provide a smooth and imperceptible transition from normal to rear manual modes.

While this invention has been described in reference to the illustrated embodiment, it will be understood that various modifications and design variations will occur to those skilled in the art. For example, the control of this invention could equally be applied to braking systems where the boost pressure is developed by a solenoid or hydraulic based mechanism. Accordingly, the scope of this invention is not limited to the illustrated embodiments, but rather, is defined by the appended claims.

The embodiments of the invention in which an exclusive property or privilege is claimed are defined as follows:

1. A control method for an electro-hydraulic braking system having electrically operated front and rear boost units selectively activated to produce hydraulic pressure in accordance with pressure commands generated by an electronic controller for operating front and rear service brakes of a vehicle in a normal braking mode, a manually developed hydraulic brake pressure, and electrically operated fluid valves coupled between the manually developed brake pressure and the front and rear service brakes for supplying the manually developed pressure to the front and rear service brakes in a manual back-up mode, the method comprising the steps of:

monitoring the vehicle speed; and when the vehicle speed is below a threshold, operating the fluid valves for the rear service brakes in the manual back-up mode while continuing to operate the fluid valves for the front service brakes in the normal braking mode.

2. The control method of claim 1, wherein the threshold is indicative of near-zero vehicle speed.

3. The control method of claim 1, including the steps of:

comparing the monitored vehicle speed to the threshold;

detecting a commencement of braking; and immediately operating the fluid valves for the rear service brakes in the manual back-up mode if commencement of braking is detected while the monitored vehicle speed is at or below the threshold.

4. The control method of claim 1, including the steps of:

comparing the monitored vehicle speed to the threshold;

detecting a commencement of braking;

detecting a substantially constant brake pressure if commencement of braking is detected while the monitored vehicle speed is above the threshold; and entering a manual back-up mode for the rear service brakes when a substantially constant brake pressure is detected.

5. The control method of claim 4, wherein the step of entering a manual back-up mode for the rear service brakes includes the steps of:

decaying the pressure command for the rear service brakes at a controlled rate; and operating the fluid valves for the rear service brakes in the manual back-up mode when the rear brake pressure reaches the manually developed brake pressure.

6. The control method of claim 1, wherein a driver commences braking by depressing a brake pedal, the method including the step of:

continuing to operate the fluid valves for the rear service brakes in the manual back-up mode until the driver releases the brake pedal.

7. A control method for an electro-hydraulic braking system having electrically activated front and rear boost units selectively activated to produce hydraulic pressure in accordance with pressure commands generated by an electronic controller for operating front and rear service brakes of a vehicle in a normal braking mode, a manually developed hydraulic brake pressure, and electrically operated fluid valves coupled between the manually developed brake pressure and the front and rear service brakes, the method comprising the steps of:

defining a rear manual braking mode in which the controller deactivates the rear boost units and operates the fluid valves to supply the manually developed pressure to the rear service brakes, while activating the front boost units and operating the fluid valves to isolate the manually developed pressure from the front service brakes;

monitoring the vehicle speed; and entering the rear manual braking mode when the vehicle speed is below a threshold.

8. The control method of claim 7, wherein the threshold is indicative of near-zero vehicle speed.

9. The control method of claim 7, including the steps of:

comparing the monitored vehicle speed to the threshold;

detecting the commencement of braking; and immediately entering the rear manual braking mode if commencement of braking is detected while the monitored vehicle speed is at or below the threshold.

10. The control method of claim 7, including the steps of:

comparing the monitored vehicle speed to the threshold;

detecting the commencement of braking; and detecting a period of substantially constant brake pressure if commencement of braking is detected while the monitored vehicle speed is above the threshold; and entering the rear manual braking mode when a period of substantially constant brake pressure is detected.

11. The control method of claim 10, wherein the step of entering the rear manual braking mode includes the steps of:

decaying the pressure command for the rear service brakes at a controlled rate; and entering the rear manual braking mode when the rear brake pressure reaches the manually developed brake pressure.

12. The control method of claim 7, wherein a driver commences braking by depressing a brake pedal, the method including the step of:

maintaining the rear manual braking mode until the driver releases the brake pedal.

* * * * *